(12) United States Patent
Bos

(10) Patent No.: US 11,542,976 B2
(45) Date of Patent: Jan. 3, 2023

(54) TOLERANCE COMPENSATOR

(71) Applicant: Magnesium Products of America Inc., Eaton Rapids, MI (US)

(72) Inventor: Jeremy Bos, Strathroy (CA)

(73) Assignee: MAGNESIUM PRODUCTS OF AMERICA INC., Eaton Rapids, MI (US)

(*) Notice: Subject to any disclaimer, the term of this patent is extended or adjusted under 35 U.S.C. 154(b) by 352 days.

(21) Appl. No.: 16/814,615

(22) Filed: Mar. 10, 2020

(65) Prior Publication Data

US 2020/0291978 A1    Sep. 17, 2020

Related U.S. Application Data

(60) Provisional application No. 62/818,978, filed on Mar. 15, 2019.

(51) Int. Cl.
*F16B 21/08* (2006.01)
*F16B 5/02* (2006.01)

(52) U.S. Cl.
CPC ............ *F16B 21/084* (2013.01); *F16B 5/025* (2013.01)

(58) Field of Classification Search
CPC ...... F16B 5/025; F16B 5/0628; F16B 5/0233; F16B 5/065; F16B 5/0657; F16B 37/00; F16B 37/041
See application file for complete search history.

(56) References Cited

U.S. PATENT DOCUMENTS

| 5,468,108 | A | * | 11/1995 | Sullivan | ................ | F16B 21/084 |
| | | | | | | 411/908 |
| 9,133,872 | B2 | | 9/2015 | Arisa Busquets | | |
| 9,302,716 | B2 | * | 4/2016 | Sahi | ...................... | F16B 5/0635 |
| 9,657,807 | B2 | | 5/2017 | Morris et al. | | |

(Continued)

FOREIGN PATENT DOCUMENTS

| DE | 31 22 402 A1 | 4/1982 |
| DE | 10300991.6 A1 | 7/2004 |
| DE | 20 2005 016 823 U1 | 3/2006 |

(Continued)

OTHER PUBLICATIONS

DE-102012221228-A1 English translation (Year: 2014).*

(Continued)

*Primary Examiner* — Jason L Vaughan
*Assistant Examiner* — Amanda Kreiling
(74) *Attorney, Agent, or Firm* — Foley & Lardner LLP

(57) ABSTRACT

Disclosed is a tolerance compensator for joining materials that are spaced apart from one another. The tolerance compensator includes a base, a compensation member, a first flange portion, a first tree fastener, a second flange portion, and a second tree fastener. The compensation member is slidably engaged with the base and disposed at least partially within a cavity defined by the base. The first flange portion and the second flange portion are coupled to the base and extend radially outwardly from the base. The first tree fastener extends away from the first flange portion. The second tree fastener extends away from the second flange portion. Each of the first tree fastener and the second tree fastener include a body and a plurality of ribs extending outwardly therefrom.

20 Claims, 8 Drawing Sheets

(56) References Cited

U.S. PATENT DOCUMENTS

2005/0254889 A1    11/2005   Roepke et al.
2014/0234054 A1    8/2014   Lutgenau et al.

FOREIGN PATENT DOCUMENTS

| DE | 20 2012 102 440 U1 | 10/2013 | |
|---|---|---|---|
| DE | 10 2012 221 228 A1 | 5/2014 | |
| DE | 102012221228 A1 * | 5/2014 | ............ F16B 5/0233 |
| DE | 20 2015 101 794 U1 | 4/2015 | |
| DE | 10 2014 006 088 A1 | 10/2015 | |
| DE | 10 2016 118 138 A1 | 3/2018 | |
| EP | 2 762 732 A1 | 8/2014 | |

OTHER PUBLICATIONS

Extended European Search Report dated Jul. 8, 2020 in counterpart European Appl. No. 20162553.0 (9 pgs.).
Foreign Action other than Search Report on CA 3075362 dated Apr. 19, 2021 (4 pages).

* cited by examiner

TOLERANCE COMPENSATOR

CROSS-REFERENCE TO RELATED PATENT APPLICATIONS

This application claims the benefit of and priority to U.S. Provisional Application No. 62/818,978, filed Mar. 15, 2019, the entire disclosure of which is hereby incorporated by reference herein.

BACKGROUND

The present application relates generally to tolerance compensators. More specifically, this application relates to a tolerance compensator for coupling a self-threading fastener to a component.

Generally speaking, tolerance compensators can be used to compensate for distances between two axially-connected components. In automotive applications, tolerance compensators can be used in the assembly of components that have dimensional or spatial variations between each other, such as instrument panels, firewalls, door frames, structural beams, and roof ledges. Conventional tolerance compensators, however, can include fastening arrangements (e.g., tangs, J-clips, etc.) that are limited to being attached to components that are made from sheet metal, which typically have a more consistent material thickness, surface geometry, and hole size/position for receiving the tolerance compensator, as compared to components that are made from, for example, a casting process.

SUMMARY

One exemplary embodiment relates to a tolerance compensator including a base, a compensation member, a first flange portion, a first tree fastener, a second flange portion, and a second tree fastener. The base defines a cavity. The compensation member is slidably engaged with the base and disposed at least partially within the cavity. The first flange portion and the second flange portion are coupled to the base and extends radially outwardly from the base. The first tree fastener extends away from the first flange portion and the second tree fastener extends away from the second flange portion. The first tree fastener includes a first body and a first plurality of ribs extending outwardly therefrom. The second tree fastener includes a second body and a second plurality of ribs extending outwardly therefrom.

Another exemplary embodiment relates to a tolerance compensator including a base. The base includes a body, a first flange portion, a first tree fastener, a second flange portion, and a second tree fastener. The body defines a cavity that is sized to receive a portion of a compensation member therein. The first flange portion and the second flange portion are each coupled to the body and extend radially outwardly from the body. The first tree fastener extends away from the first flange portion. The first tree fastener includes a first body and a first plurality of ribs extending outwardly from the first body. The second tree fastener includes a second body and a second plurality of ribs extending outwardly from the second body.

Yet another exemplary embodiment relates to a body panel assembly including a panel and a tolerance compensator. The panel defines a first panel opening and a second panel opening spaced apart from the first panel opening. The tolerance compensator includes a base, a compensation member, a first flange portion and a second flange portion. The base defines a cavity. The compensation member is slidably engaged with the base and is disposed at least partially within the cavity. The first flange portion and the second flange portion are coupled to the base and extend radially outwardly from the base. The first flange portion includes a first tree fastener extending through the first panel opening. The second flange portion includes a second tree fastener extending through the second panel opening.

This summary is illustrative only and is not intended to be in any way limiting.

DETAILED DESCRIPTION

Before turning to the FIGURES, which illustrate certain exemplary embodiments in detail, it should be understood that the present disclosure is not limited to the details or methodology set forth in the description or illustrated in the FIGURES. It should also be understood that the terminology used herein is for the purpose of description only and should not be regarded as limiting.

Referring generally to the FIGURES, disclosed herein is a tolerance compensator having unique attachment features that can facilitate coupling the compensator to components that have variations in material thickness and surface geometry (e.g., different draft angles, etc.). The disclosed tolerance compensator also includes features that can help to axially align the compensator between components that have variations in hole location for attaching the compensator. In this manner, the disclosed tolerance compensator can account for dimensional tolerances on a variety of components that are prone to have variations in material thickness, surface geometry, and hole location, such as components that are cast from magnesium or other types of materials (e.g., aluminum, etc.). For example, the disclosed tolerance compensator can, advantageously, be used to couple a self-threading fastener into a screw boss on a component made from a casting process, such as a magnesium-casted component.

An exemplary embodiment of the present application relates to a tolerance compensator. The tolerance compensator includes a compensation member, a base, a first tree fastener, and a second tree fastener. The base defines a cavity that at least partially receives the compensation member. The compensation member is configured to move axially away from the base in response to rotational engagement with a self-threading fastener. The base further includes a flange extending radially outwardly away from the base. The flange includes a first opening and a second opening. The first tree fastener and the second tree fastener each include a head and a body extending from the head. The body of the first tree fastener extends through the first opening and the body of the second tree fastener extends through the second opening. Each body includes a plurality of ribs extending outwardly therefrom. Each body is configured to be inserted into an opening of a component such that the plurality of ribs elastically deform to create an interference condition with the component, so as to retain the tolerance compensator to the component in an axial direction.

Figure 1:
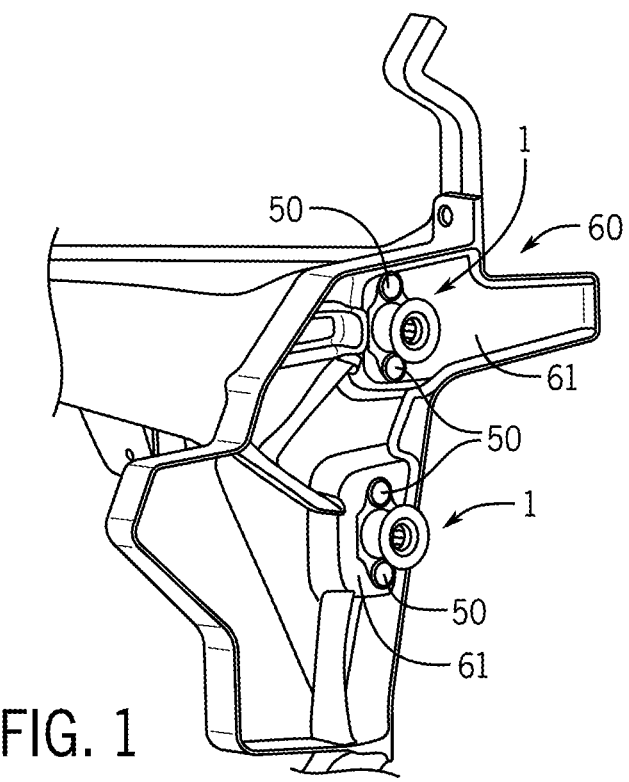
FIGS. 1-2 are partial perspective views of an assembly including an instrument panel and two tolerance compensators, according to an exemplary embodiment.
Figure 2:
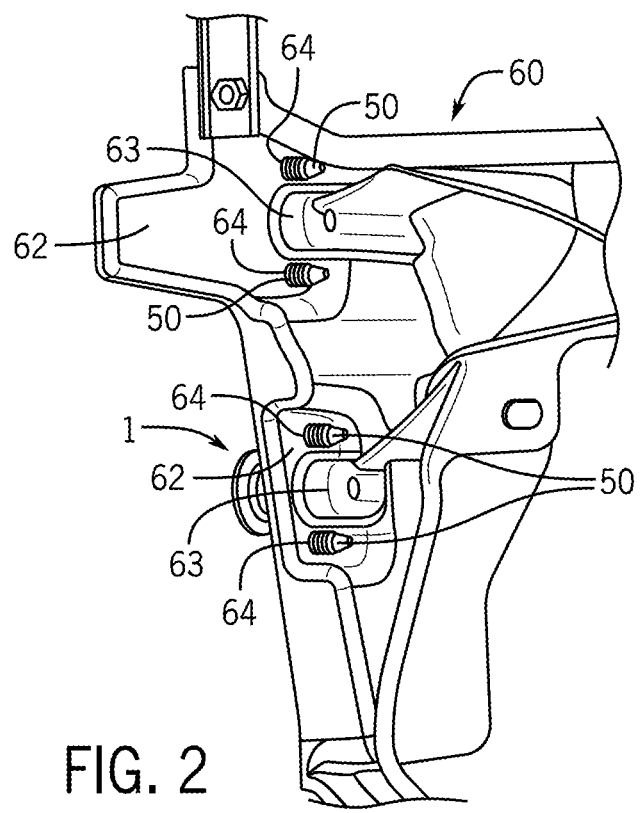

Referring to FIGS. 1-2, a component, shown as an instrument panel 60 for a vehicle, includes a plurality of tolerance compensators 1 coupled to a side portion of the instrument panel 60, according to an exemplary embodiment. The tolerance compensator 1 can be used to compensate for a dimensional gap between the instrument panel 60 and a mating component during assembly (e.g., a vehicle firewall, etc.). According to an exemplary embodiment, the instrument panel 60 is a casted part made from, for example, magnesium. The tolerance compensator 1 is at least temporarily coupled to an outer side surface 61 of the instrument panel 60 using a plurality of tree fasteners 50 that are received in corresponding openings (e.g., panel openings, etc.), shown as holes 64 disposed through the outer side surface 61. The tree fasteners 50 can, advantageously, account for variations in the material thickness, surface geometry, or hole location of the instrument panel 60 that may result from the casting process, the details of which are discussed in the paragraphs that follow. In this way, the tolerance compensator 1 can be coupled and adjusted relative to the instrument panel 60, such that a self-threading fastener (e.g., self-threading fastener 2 shown in FIG. 3) can be received through the tolerance compensator 1 and into a boss 63 (FIG. 2) disposed on an inner side surface 62 of the instrument panel 60 opposite the tolerance compensator 1, so as to securely couple the instrument panel 60 to a mating component (e.g., a portion of a firewall, etc.).

Figure 3:
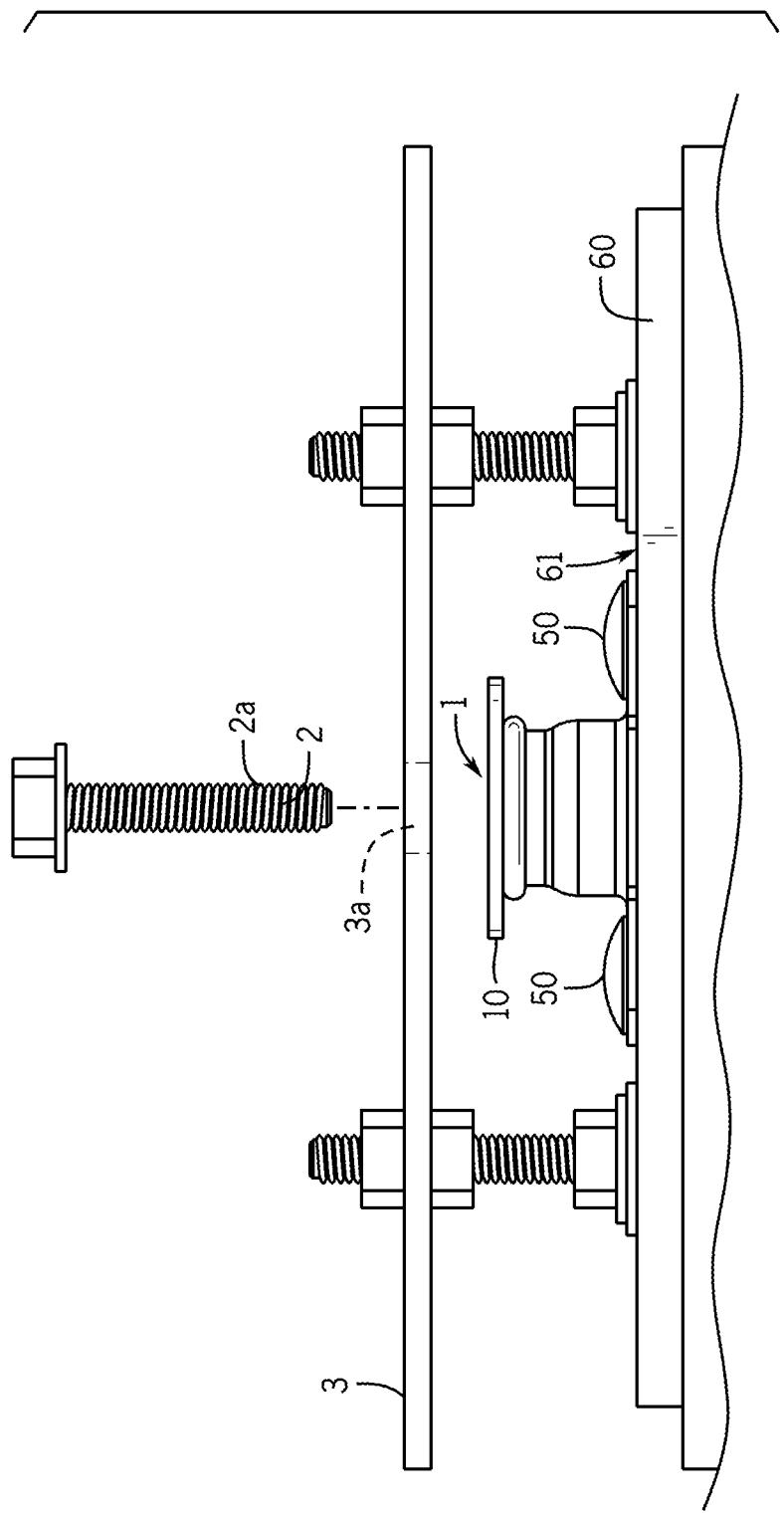
FIG. 3 is a side view of a prototype assembly including a metal plate and a portion of an instrument panel with a tolerance compensator coupled therebetween, according to another exemplary embodiment.
Figure 4:
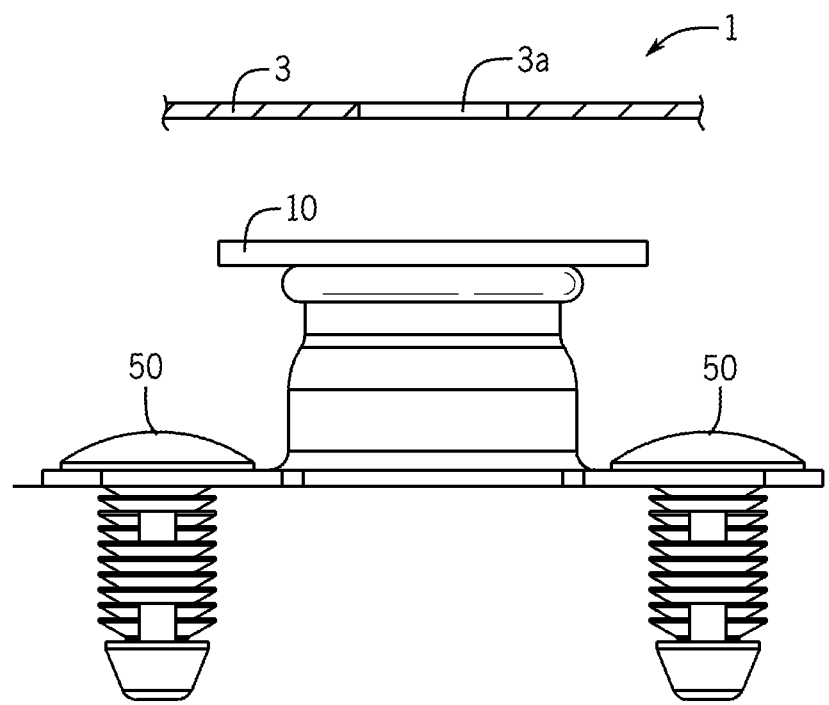
FIG. 4 is a side view of the tolerance compensator of FIG. 3 shown in a closed position, according to an exemplary embodiment.
Figure 5:
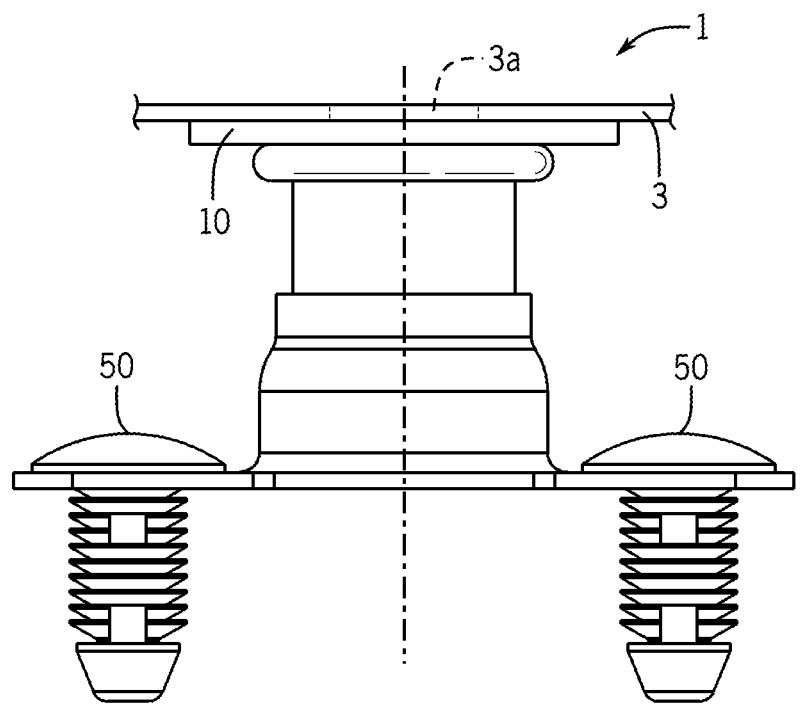
FIG. 5 is a side view of the tolerance compensator of FIG. 3 shown in an open position to bridge a tolerance gap with the metal plate, according to an exemplary embodiment.

For example, referring to FIGS. 3-5, a prototype version of the tolerance compensator 1 is shown coupled to an outer side surface 61 of a prototype version of the instrument panel 60, according to another exemplary embodiment. A mating component, shown as a metal plate 3, is spaced apart from an end portion (e.g., compensation member 10) of the tolerance compensator 1 to represent the assembly tolerance gap between a firewall of a vehicle (represented by metal plate 3) and the instrument panel 60. The metal plate 3 includes an opening 3a for receiving a self-threading fastener 2 to couple to a screw boss (e.g., boss 63 shown in FIGS. 6-7) disposed on a rear portion of the instrument panel 60, opposite the side surface 61. The self-threading fastener 2 is configured to extend through each of the opening 3a and the tolerance compensator 1, and into the screw boss (e.g., boss 63) of the instrument panel 60, so as to securely couple the metal plate 3 to the instrument panel 60. For example, the tolerance compensator 1 includes a compensation member 10 that is configured to be engaged by threads 2a of the self-threading fastener 2, such that the compensation member 10 can move along an axial direction toward the metal plate 3 from a closed position shown in FIGS. 3-4 to an open position shown in FIG. 5, so as to bridge the gap between the metal plate 3 and the instrument panel 60 as the self-threading fastener 2 is threaded into the screw boss of the instrument panel 60. Additional details regarding the structure and operation of the tolerance compensator 1 are discussed below.

Traditional fasteners are not well suited to the attachment of components that are spaced apart from one another, and particularly in the context of components that are made from a casting process, such as the instrument panel 60. Cast components may have variations in material thickness, surface geometry (e.g., draft angle, etc.), and hole size/position resulting from the casting process, which can cause misalignment with a conventional tolerance compensator designed to interface with, for example, sheet metal. As shown in FIGS. 3-5, the tolerance compensator 1, advantageously, includes a plurality of flexible tree fasteners 50 (e.g., fir tree fasteners, tree-type fasteners, etc.) that are configured to be received in corresponding holes of a component, such as holes 64 of the instrument panel 60, to at least temporarily couple the tolerance compensator 1 to the instrument panel 60. In the exemplary embodiment of FIGS. 3-5, the tree fasteners 50 are removably coupled to the tolerance compensator 1 and are adjustable/flexible to account for variations in the surface geometry of the instrument panel 60 (e.g., draft angle of outer side surface 61, etc.), the material thickness of the instrument panel 60, and the size and/or location of the holes 64 on the instrument panel 60, so as to facilitate proper alignment between the tolerance compensator 1 and the instrument panel 60. In this manner, the tolerance compensator 1 can be used to align and couple a self-threading fastener (e.g., self-threading fastener 2) to, for example, a boss 63 of the instrument panel 60 during final assembly between the instrument panel 60 and the metal plate 3.

Figure 8:
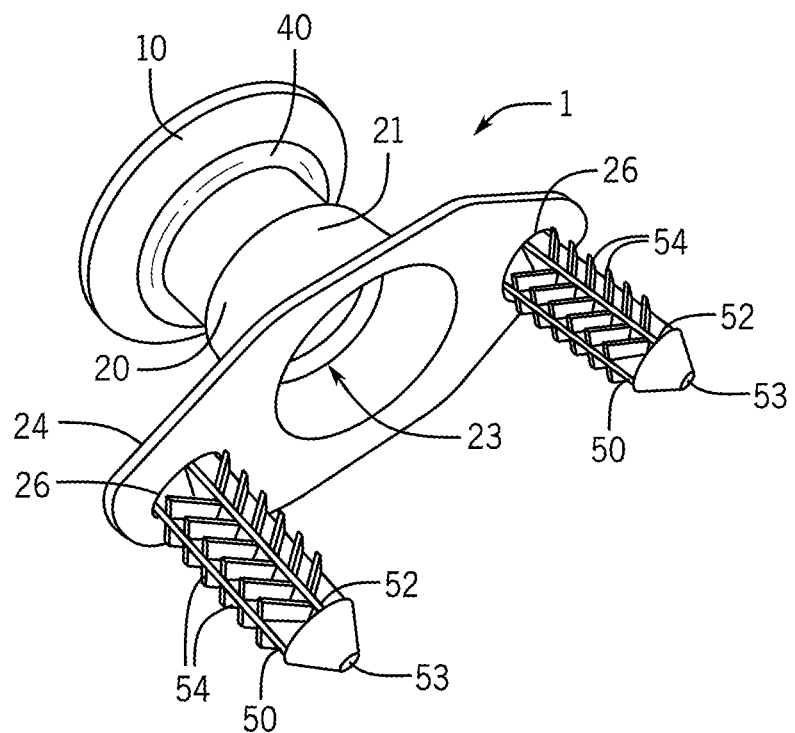
FIG. 8 is a rear perspective view of a tolerance compensator, according to another exemplary embodiment.
Figure 9:
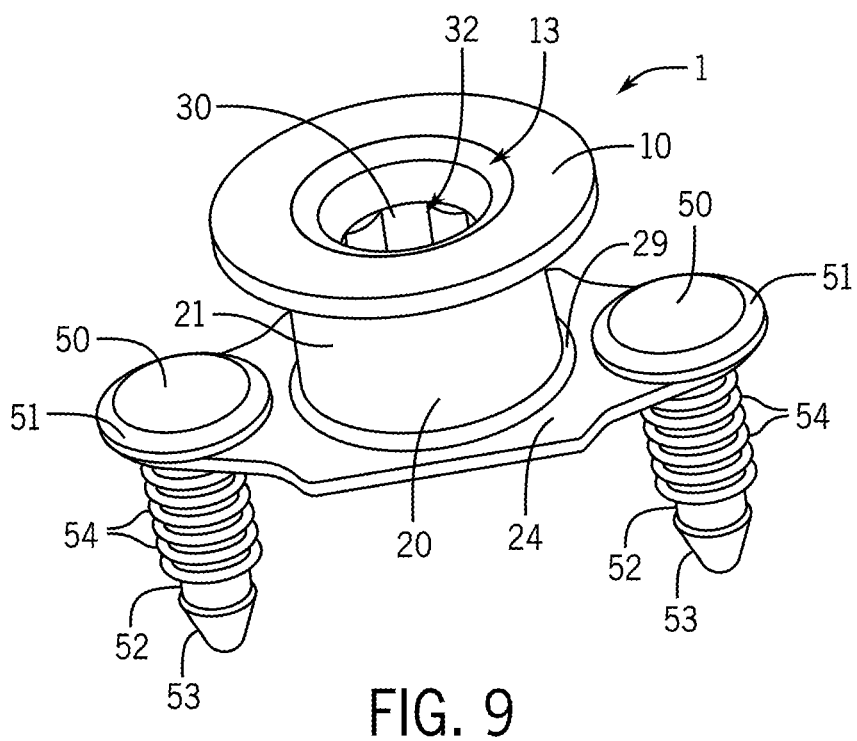
FIG. 9 is a front perspective view of the tolerance compensator of FIG. 8.
Figure 10:
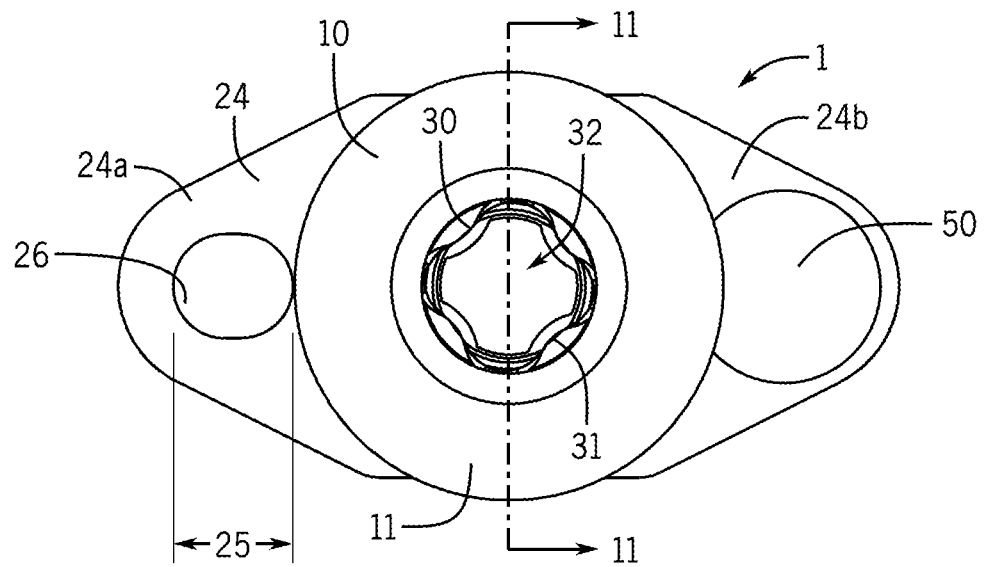
FIG. 10 is a top view of a portion of the tolerance compensator of FIG. 8.
Figure 11:
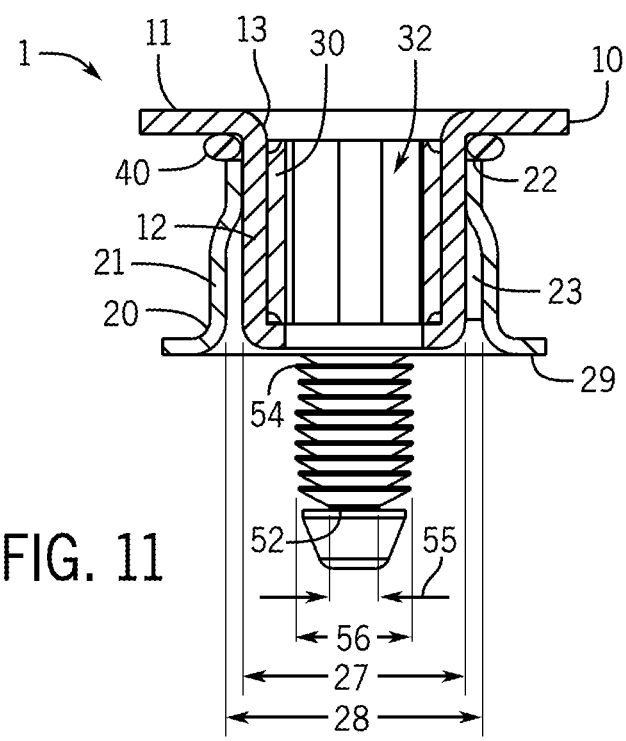
FIG. 11 is a side cross-sectional view the tolerance compensator of FIG. 8 taken along line 11-11 in FIG. 10.
Figure 12:
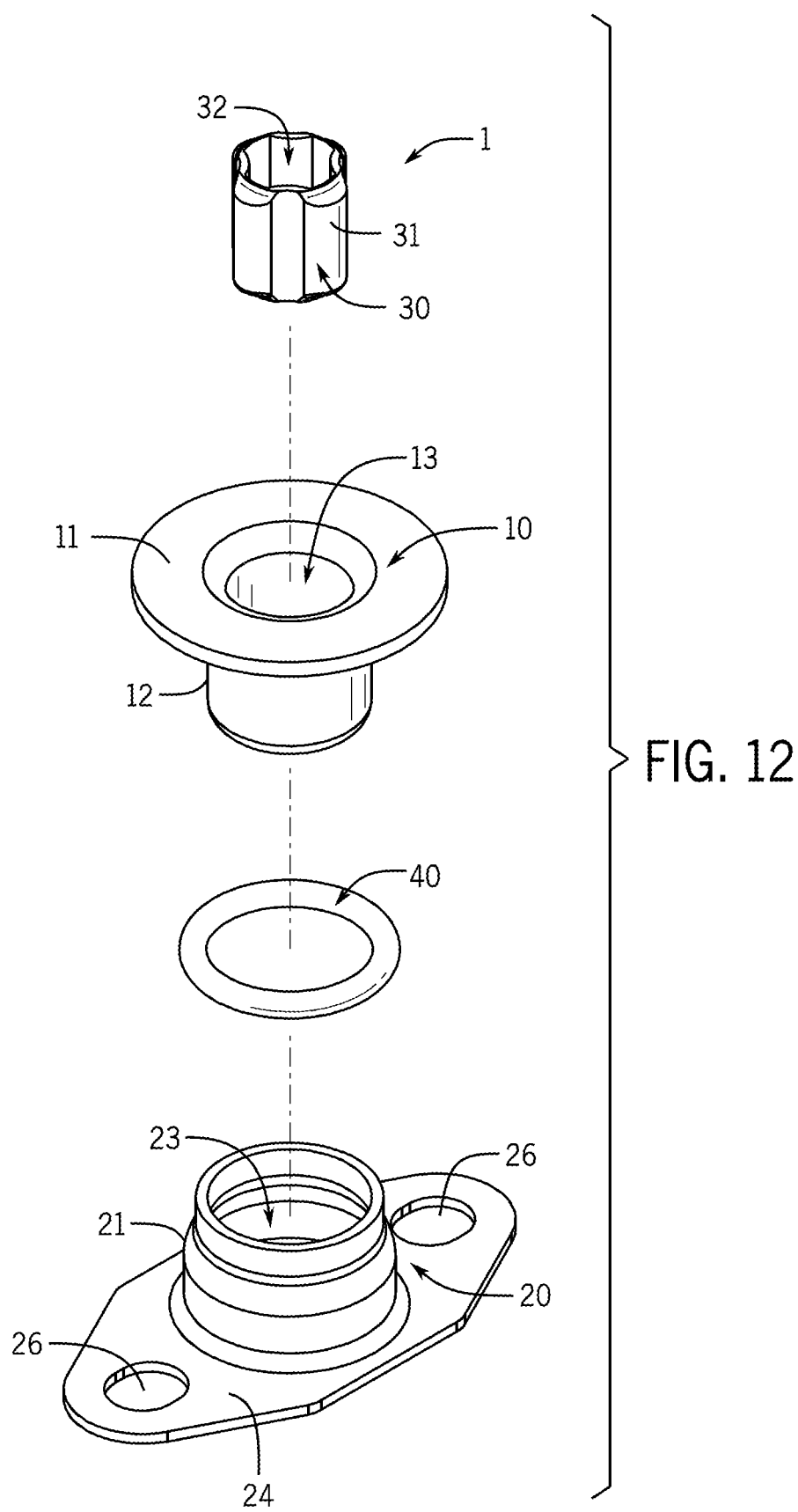
FIG. 12 is an exploded view of the tolerance compensator of FIG. 8.

Referring to FIGS. 6-12, a tolerance compensator 1 is shown according to another exemplary embodiment. The structure of the tolerance compensator 1 may be the same or similar to the tolerance compensator 1 of FIGS. 1-5. As such, similar numbering will be used to identify similar components. The tolerance compensator 1 includes a compensation member 10, a base 20, a retainer 30 (e.g., sleeve, etc.), a spacer 40 (e.g., O-ring, etc.), and a plurality of tree fasteners 50 (e.g., fir tree fasteners, tree-type fasteners, etc.). As shown in FIG. 11, the compensation member 10 has a generally hollow cylindrical shape including an upper flange 11 and a body 12 extending from the upper flange 11 that defines an opening 13. The retainer 30 is coupled within the opening 13 of the compensation member 10. As shown in FIGS. 10 and 12, the retainer 30 includes a plurality of lobes 31 that cooperatively define a through hole 32. The plurality of lobes 31 are configured to be engaged by the threads of a self-threading fastener (e.g., self-threading fastener 2, etc.). For example, the retainer 30 may be made from a deformable material (e.g., plastic, etc.) that is configured to plastically deform in response to engagement with the threads of a self-threading fastener. As shown in FIG. 11, the base 20 includes a hollow cylindrical body 21 that defines a cavity 23 configured (e.g., sized) to house the compensation member 10 including the retainer 30. An inner diameter of the base 20 increases moving from an upper end 22 of the base 20 (e.g., proximal end adjacent to the upper flange 11) toward a lower end 29 of the base 20 (e.g., distal end opposite the upper end) such that an upper inner diameter 27 is less than a lower inner diameter 28. The upper inner diameter 27 is sized to receive the compensation member 10 therein and to prevent lateral movement of the compensation member 10 with respect to the base 20. In the exemplary embodiment of FIG. 11, the inner diameter of the base 20 increases gradually at an intermediate position (e.g., between the midpoint along the base and the upper end, a distance below the upper end that is greater than a thickness of the cylindrical body 21, etc.) between the upper end and the lower end, such that at least a portion of the inner wall of the base 20 provides support to the compensation member 10, which, advantageously, prevents the compensation member 10 from tilting with respect to the base 20 while minimizing the frictional force between the compensation member 10 and the base 20 in an axial direction. In other embodiments, shape of the base 20 may be different. For example, the base 20 may be shaped such that there is a step change in inner diameter at the intermediate position between the upper end and the lower end or another suitable shape.

As shown in FIG. 11, the spacer 40 is coupled to the body 12 of the compensation member 10, and is configured to maintain separation between the compensation member 10 and the base 20. In one exemplary embodiment, the spacer 40 is disposed in a space formed between a lower surface of the upper flange 11 and an upper edge of the base 20. The spacer 40 is engaged with the upper flange 11 and the upper edge of the base 20 when the compensation member 10 is full interested into the cavity 23. The compensation member 10 is movably coupled to the base 20 (e.g., threadably, slidably, etc.), such that the compensation member 10 can move axially relative to the base 20 (e.g., in and out of the cavity) in response to rotational engagement between a self-threading fastener and the retainer 30. As shown in FIG. 8, the spacer 40 circumferentially surrounds the body 12 of the compensation member 10 and is tensioned around the body 12 such that the spacer 40 moves with the compensation member 10 as it moves into and out of the base 20.

For example, the retainer 30 is configured to be engaged by threads of a self-threading fastener (e.g., self-threading fastener 2, etc.), such that the retainer 30 can "walk" along the threads of the fastener as the fastener is tightened to, for example, a screw boss 63 (FIGS. 6-7) on an instrument panel 60. This rotational movement can cause the compensation member 10 to move axially away from the base 20 and extend outwardly until the compensation member 10 engages the mating component, as shown in the exemplary embodiment of FIGS. 4-5. In this way, the compensation member 10 can compensate for tolerance gaps between components that are assembled together using a self-threading fastener.

Figure 6:
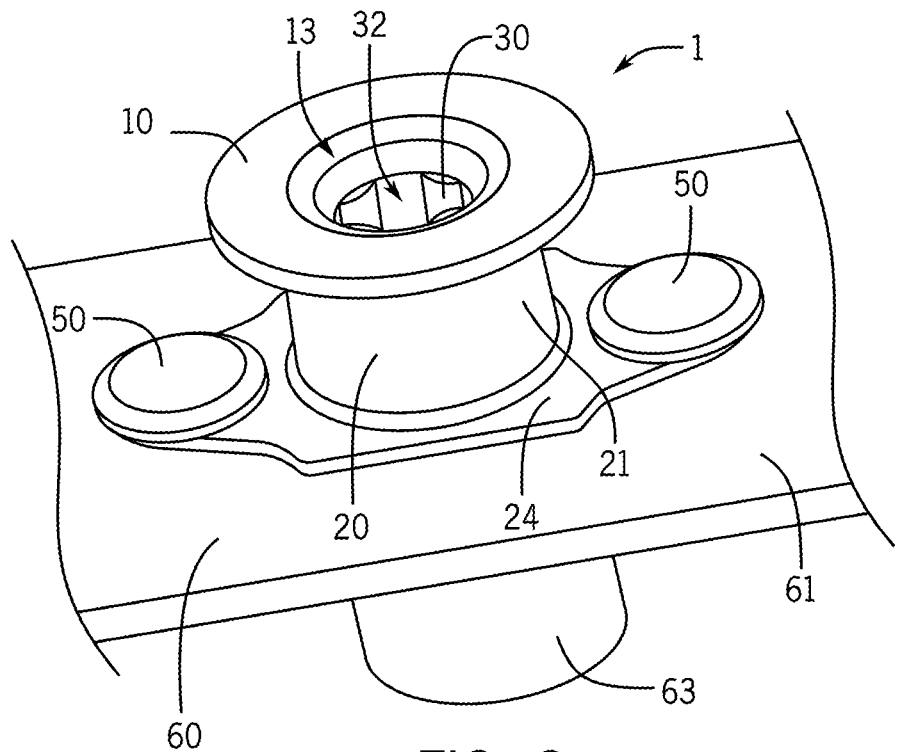
FIG. 6 is a partial top perspective view of an assembly including a tolerance compensator coupled to an instrument panel, according to another exemplary embodiment.
Figure 7:
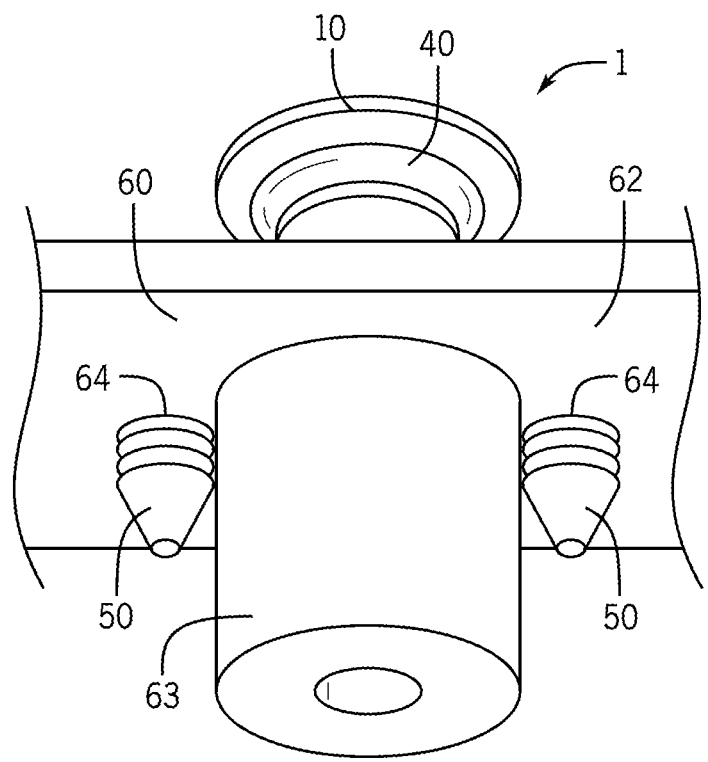
FIG. 7 is a partial rear perspective view of the assembly of FIG. 6.

As shown in FIGS. 8-10, the base 20 further includes a flange 24 extending radially outwardly from a lower portion (e.g., lower end 29 as shown in FIG. 9) of the base 20. The flange 24 is configured to engage a surface of a component, such as outer side surface 61 (FIG. 6). The flange 24 may be coupled to, or integrally formed with, the base 20. In the exemplary embodiment of FIGS. 8-10, the flange 24 includes multiple portions (e.g., wings, etc.) that extend radially outwardly from the base 20 on different sides of the base (e.g., different circumferential positions around the base). In some embodiments, the portions may be decoupled from one another. In other embodiments, the portions may be directly connected to one another (e.g., integrally formed) and circumferentially surround the base 20. As shown in FIG. 10, the flange 24 is generally planar and defines two openings, shown as holes 26 that are diametrically opposed on opposite sides of the compensation member 10 (and base 20) and are spaced apart from the base 20 in a radial direction (e.g., relative to a central axis of the base 20). According to other exemplary embodiments, the holes 26 are positioned at different relative locations on the flange 24, a first hole 26 on a first portion 24a of the flange 24 and a second hole 26 on a second portion 24b of the flange 24. In addition, the flange 24 may include more or fewer than two holes 26, according to other exemplary embodiments. The holes 26 are each configured to receive a portion of a tree fastener 50 therethrough, so as to couple the tolerance compensator 1 to a component, such as the instrument panel 60. Each tree fastener 50 may be removably coupled to the tolerance compensator 1. According to an exemplary embodiment, the holes 26 are oversized or slotted relative to the tree fasteners 50 to permit lateral adjustment of the tree fasteners 50 relative to the flange 24. In this manner, the tolerance compensator 1 can "float" relative to a component (e.g., instrument panel 60, etc.) to allow for lateral adjustment between the tolerance compensator 1 and the component during the assembly process, the details of which are discussed in the paragraphs that follow.

According to the various exemplary embodiments shown in FIGS. 6-9, the tree fasteners 50 may each include a head 51 and an elongate, cylindrical body 52 extending from the head 51. The head 51 is generally planar and is configured to engage an upper surface of the flange 24. The body 52 is configured to extend through the holes 26 prior to installation of the tolerance compensator 1 to a component. A distal end 53 of the body 52 may have a tapered portion that is configured to aid in locating and installing the tree fasteners 50 into holes of a component, such as the holes 64 in the instrument panel 60. In addition, the body 52 includes a plurality of flexible ribs 54 (e.g., wings, tabs, etc.) extending outwardly away from the body 52 along a length of the body 52 (which may give the tree fasteners 50 the appearance of a "fir tree"). The ribs 54 may extend generally radially away from the body 52 and may be spaced apart from each other along a longitudinal length of the body 52. Each rib 54 may extend about a portion of, or the entire circumference of, the body 52. The tree fasteners 50 may be made from a flexible polymeric material, such as nylon, etc. The tree fasteners 50 are configured to be received in the holes 26 of the flange 24, and into corresponding holes 64 of the instrument panel 60 (see FIG. 7). The ribs 54 may be able to selectively elastically deform when a force is applied, such as during installation of the tree fasteners 50 into the holes 26 and/or the holes 64, so as to retain the tree fasteners 50 on the flange 24 and/or the instrument panel 60.

For example, the ribs 54 may extend outwardly to define a diameter of the body 52 that is greater than the diameter of the holes 64 (see FIG. 7) such that, during installation of the tree fasteners 50 into the holes 64, the ribs 54 may interfere with the portion of the instrument panel 60 that defines the holes 64, which may help to retain the tree fasteners 50 to the instrument panel 60. Due to the elasticity and flexibility of the ribs 54, the ribs 54 may deflect upwardly and inwardly toward the body 52 as each tree fastener 50 is forced into a corresponding hole 64. Some of the ribs 54 may be able to pass through the hole 64, which will cause them to elastically return to an initial orientation (i.e., outwardly extending orientation) to thereby overlap a rear portion of the instrument panel 60 adjacent the hole 64.

In this way, the tree fasteners 50 can, advantageously, help to retain the tolerance compensator 1 on the instrument panel 60 before final assembly with a mating component. Additionally, the tree fasteners 50 may allow for adjustment of the tolerance compensator 1 relative to the instrument panel 60 before final assembly, as discussed in greater detail below.

Similarly, the ribs 54 may define a diameter of the body 52 that is greater than the diameter of the holes 26 on the flange 24 (see FIG. 8), such that during installation of the tree fasteners 50 into the holes 26, the ribs 54 may interfere with the portion of the flange 24 that defines the holes 26. The ribs 54 may deflect upwardly and inwardly toward the body 52 as each tree fastener 50 is forced into a corresponding hole 26. At least some, or all, of the ribs 54 may pass through the hole 26, at which point they will elastically return to an initial orientation, so as to overlap a rear portion of the flange 24 adjacent the holes 26. According to an exemplary embodiment, the diameter and/or width 25 of the holes 26 is larger (e.g., oversized, slotted, etc.) than a diameter 55 of the body 52 (see FIGS. 10 and 11), but is less than an outermost diameter 56 of the tree fastener 50 including the ribs 54 (e.g., an outer diameter of the ribs 54). In this way, the tree fasteners 50 can float or move laterally relative to the flange 24 to permit lateral adjustment of the tolerance compensator 1 relative to a component, but are retained along an axial direction on the flange 24 by one or more of the ribs 54.

The elastic flexibility of the ribs 54 on the tree fasteners 50 can, advantageously, allow for the tolerance compensator 1 to be coupled to components that may have variations in hole location or hole size, such as on a component made from a casting process (e.g., instrument panel 60, etc.). Furthermore, the separation of the ribs 54 along a longitudinal length of the tree fasteners 50 can allow for the tolerance compensator 1 to be coupled to components that may have variations in material thickness. In addition, the adjustability of the tree fasteners 50 relative to the flange 24 (e.g., if the flange 24 includes oversized/slotted holes 26, etc.) can allow for lateral adjustment of the tolerance compensator 1 relative to a component, so as to facilitate axial alignment of, for example, a self-threading fastener with a screw boss on the component.

Figure 13:
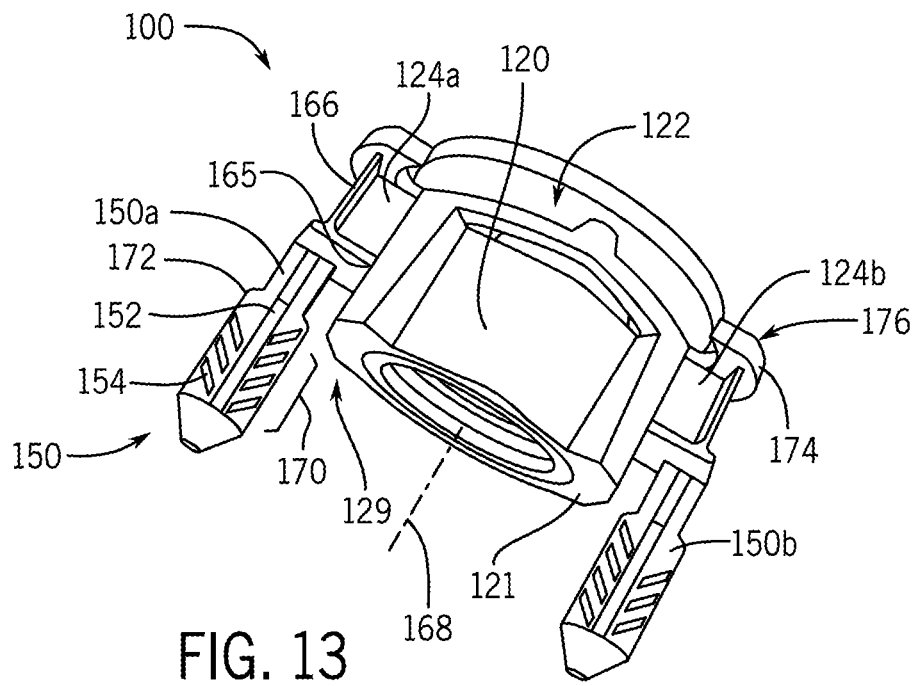
FIG. 13 is a perspective view of a tolerance compensator, according to another exemplary embodiment.
Figure 14:
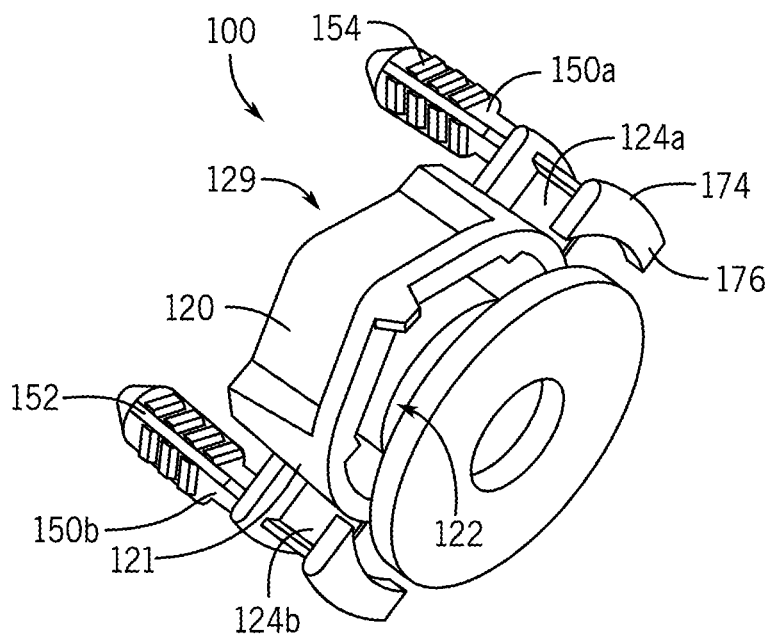
FIG. 14 is another perspective view of the tolerance compensator of FIG. 13.

The design and arrangement of the tolerance compensator 1 described with reference to FIGS. 1-12 should not be considered limiting. Various alternatives and combinations are possible without departing from the inventive concepts disclosed herein. For example, FIGS. 13-14 show a tolerance compensator 100 in which the base 120 and the pair of tree fasteners 150 are integrally formed as a single unitary body. As shown in FIG. 13, the base 120 includes a hollow cylindrical body 121 and at least one flange portion, shown as first flange portion 124*a* extending radially outwardly from the cylindrical body 121. The first flange portion 124*a* extends from an upper end 122 of the cylindrical body 121 to at an intermediate position 165 between the upper end 122 and a lower end 129 of the cylindrical body 121 and is engaged with the cylindrical body 121 between the intermediate position 165 and the upper end 122. In the exemplary embodiment of FIGS. 13-14, the first flange portion 124*a* includes structural ribs 166 spaced apart from the cylindrical body 121 to increase the strength of the first flange portion 124*a*.

As shown in FIGS. 13-14, a first tree fastener 150*a* of the pair of tree fasteners 150 is integrally formed with the first flange portion 124*a* and extends downwardly from the first flange portion 124*a* in a direction parallel to a central axis 168 of the cylindrical body 121. The first tree fastener 150*a* is spaced apart from the cylindrical body 121 along its entire length by the first flange portion 124*a*. A ribbed portion 170 of the first tree fastener 150*a* is positioned below the lower end 129 of the cylindrical body 121. The first tree fastener 150*a* is shown to include a body 152 defining a plurality of vertically oriented panels 172. The panels 172 extend along an upper portion of the first tree fastener 150*a* and radially outwardly from a central axis of the first tree fastener 150*a*. A length of each panel 172 in a radial direction increases in a stepwise fashion adjacent to the lower end 129 of the cylindrical body 121, such that the length of each panel is greater below the cylindrical body 121.

As shown in FIGS. 13-14, the flexible ribs 154 are disposed along a length of two of the panels 172, on opposing sides of the panels 172. The flexible ribs 154 are oriented at an oblique angle relative to the central axis of the first tree fastener 150*a*. In other embodiments, the arrangement of, and spacing between, each of the flexible ribs 154 may be different. As shown in FIGS. 13-14, a lower end of the first tree fastener 150*a* is tapered to facilitate alignment between the first tree fastener 150*a* and a corresponding hole in an instrument panel (e.g., instrument panel 60 of FIG. 3, etc.).

As shown in FIGS. 13-14, an upper portion of the first flange portion 124*a* forms a wall 174 (e.g., ledge, shelf, etc.) defining a generally planar surface 176 that is positioned above the upper end 122 of the cylindrical body 121. A height of the base 120, between the surface 176 and the lower end 129 of the cylindrical body 121 sets a minimum separation distance between an instrument panel and a joining structure that can be accommodated by the tolerance compensator 100. In other exemplary embodiments, an upper end of the first flange portion 124*a* may be coplanar with the upper end 122 of the cylindrical body 121, or positioned below the upper end 122 of the cylindrical body 121.

According to an exemplary embodiment, and as shown in FIGS. 13-14, a second flange portion 124*b* is symmetrical with the first flange portion 124*a* (e.g., a mirror image, etc.). Similarly, a second tree fastener 150*b* of the pair of tree fasteners 150 is symmetrical with the first tree fastener 150*a*. In other exemplary embodiments, the design, number, and arrangement of each tree fastener relative to the cylindrical body 121 may be different.

As described above, the disclosed tolerance compensator can account for dimensional tolerances on a variety of components that are prone to have variations in material thickness, surface geometry, and hole location, such as components that are cast from magnesium or other types of materials.

No claim element herein is to be construed under the provisions of 35 U.S.C. § 112(f), unless the element is expressly recited using the phrase "means for."

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, and/or illustrations of possible embodiments (and such terms are not intended to connote that such embodiments are necessarily extraordinary or superlative examples).

The term "coupled," as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, and/or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the tolerance compensators and the components/elements, as shown in the various exemplary embodiments, are illustrative only. Additionally, any element disclosed in an exemplary embodiment may be incorporated or utilized with any other embodiment disclosed herein. Although only one example of an element from an exemplary embodiment that can be incorporated or utilized in another embodiment has been described above, it should be appreciated that other elements of the various embodiments may be incorporated or utilized with any of the other embodiments disclosed herein.

What is claimed is:

1. A tolerance compensator, comprising:
a base defining a cavity;
a compensation member slidably engaged with the base and disposed at least partially within the cavity;
a first flange portion coupled to the base and extending radially outwardly from the base, the first flange portion engaged with an upper end of the base;
a first tree fastener coupled to the first flange portion and protruding below a lower end of the base, the first tree fastener comprising a first body and a first plurality of ribs extending outwardly from the first body;
a second flange portion coupled to the base and extending radially outwardly from the base, the second flange portion engaged with the upper end of the base; and
a second tree fastener coupled to the second flange portion and protruding below the lower end of the base, the second tree fastener comprising a second body and a second plurality of ribs extending outwardly from the second body.

2. The tolerance compensator of claim 1, wherein the first tree fastener and the second tree fastener are each spaced apart from the base in a radial direction.

3. The tolerance compensator of claim 1, wherein the first tree fastener and the second tree fastener are diametrically opposed on opposite sides of the base.

4. The tolerance compensator of claim 1, wherein the first tree fastener is integrally formed with the first flange portion as a single unitary body.

5. The tolerance compensator of claim 4, wherein the first flange portion is integrally formed with the base as a single unitary body.

6. The tolerance compensator of claim 1, wherein the first plurality of ribs are spaced apart in equal intervals along a longitudinal length of the first tree fastener.

7. The tolerance compensator of claim 1, wherein the first tree fastener is made from a flexible polymeric material, and wherein the first tree fastener is configured to elastically deform during installation of the first tree fastener into an opening of a panel to couple the first tree fastener to the panel.

8. The tolerance compensator of claim 1, wherein the first tree fastener is spaced apart from the base in a radial direction by the first flange portion.

9. The tolerance compensator of claim 1, wherein the first flange portion and the second flange portion together define an upper surface that is configured to set a minimum separation distance between the base and a joining structure.

10. The tolerance compensator of claim 1, wherein the first flange portion and the second flange portion are integrally formed as a single unitary body.

11. The tolerance compensator of claim 1, wherein the compensation member comprises a body defining a hollow portion and an upper flange coupled to an upper end of the body, wherein the tolerance compensator further comprises:
a retainer coupled to the body and positioned within the hollow portion; and
a spacer disposed between the upper flange and the base.

12. A tolerance compensator, comprising:
a base, comprising:
a body defining a cavity, the cavity sized to receive a portion of a compensation member therein;

a first flange portion coupled to the body and extending radially outwardly from the body, the first flange portion engaged with an upper end of the body;

a first tree fastener coupled to the first flange portion and protruding below a lower end of the body, the first tree fastener comprising a first body and a first plurality of ribs extending outwardly from the first body;

a second flange portion coupled to the body and extending radially outwardly from the body, the second flange portion engaged with the upper end of the body; and a second tree fastener coupled to the second flange portion and protruding below the lower end of the body, the second tree fastener comprising a second body and a second plurality of ribs extending outwardly from the second body.

13. The tolerance compensator of claim 12, wherein an inner diameter of the body increases gradually at an intermediate position between an upper end of the body and the lower end.

14. The tolerance compensator of claim 12, wherein the first tree fastener and the second tree fastener are diametrically opposed on opposite sides of the body.

15. The tolerance compensator of claim 12, wherein the first tree fastener and the first flange portion are integrally formed with the body as a single unitary structure.

16. The tolerance compensator of claim 12, wherein the first plurality of ribs are spaced apart in equal intervals along a longitudinal length of the first tree fastener.

17. A body panel assembly, comprising:
a panel defining a first panel opening and a second panel opening spaced apart from the first panel opening;
a tolerance compensator, comprising:
a base defining a cavity;
a compensation member slidably engaged with the base and disposed at least partially within the cavity;
a first flange portion coupled to the base and extending radially outwardly from the base, the first flange portion engaged with an upper end of the base, the first flange portion including a first tree fastener protruding below a lower end of the base and extending through the first panel opening; and
a second flange portion coupled to the base and extending radially outwardly from the base, the second flange portion engaged with the upper end of the base, the second flange portion including a second tree fastener protruding below the lower end of the base and extending through the second panel opening.

18. The body panel assembly of claim 17, wherein the first tree fastener comprises a body and a plurality of ribs extending outwardly from the body, wherein the body extends through the first panel opening, and wherein an outer diameter of the plurality of ribs is greater than a diameter of the panel opening.

19. The body panel assembly of claim 18, wherein the first tree fastener and the second tree fastener are each spaced apart from the base in a radial direction.

20. The body panel assembly of claim 18, wherein the first plurality of ribs are spaced apart in equal intervals along a longitudinal length of the first tree fastener.

* * * * *